(12) United States Patent
Rodriguez et al.

(10) Patent No.: US 8,738,434 B1
(45) Date of Patent: May 27, 2014

(54) METHOD AND SYSTEM FOR GENERATING DEALS FOR A BUSINESS USING A SOFTWARE APPLICATION

(75) Inventors: Leonardo J. Rodriguez, San Francisco, CA (US); Eric D. Moyer, Belmont, CA (US); Lakshmi Venkatesan, San Francisco, CA (US); Sachin A. Kadakia, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 337 days.

(21) Appl. No.: 13/182,058

(22) Filed: Jul. 13, 2011

(51) Int. Cl.
*G06Q 30/00* (2012.01)

(52) U.S. Cl.
USPC .............. 705/14.13; 705/14.25; 705/7.35; 705/7.31

(58) Field of Classification Search
USPC .............. 705/14.13, 14.25, 7.35, 7.31
See application file for complete search history.

(56) References Cited

U.S. PATENT DOCUMENTS

| | | | | |
|---|---|---|---|---|
| 7,133,848 B2* | 11/2006 | Phillips et al. | | 705/400 |
| 7,379,890 B2* | 5/2008 | Myr et al. | | 705/7.35 |
| 7,680,686 B2* | 3/2010 | Tellefsen et al. | | 705/7.31 |
| 7,734,503 B2* | 6/2010 | Agarwal et al. | | 705/14.43 |
| 8,117,067 B2* | 2/2012 | Ketchum | | 705/14.4 |
| 8,374,906 B1* | 2/2013 | Williams et al. | | 705/7.35 |
| 2010/0070346 A1* | 3/2010 | Davis | | 705/14.13 |
| 2011/0112897 A1* | 5/2011 | Tietzen et al. | | 705/14.25 |
| 2011/0320246 A1* | 12/2011 | Tietzen et al. | | 705/14.4 |
| 2013/0080239 A1* | 3/2013 | Okerlund | | 705/14.33 |

OTHER PUBLICATIONS

Clemons, Eric K. and Weber, Bruce W., "Segmentation, Differentiation, and Flexible Pricing: Experience with Information Technology and Segment-Tailored Strategies", Fall 1994, vol. 11, Iss. 2; p. 9, 28 pages.*

* cited by examiner

*Primary Examiner* — Michael Bekerman
(74) *Attorney, Agent, or Firm* — Osha Liang LLP

(57) ABSTRACT

A method for generating a deal for a business, including identifying a deal goal of the business, obtaining a plurality of previous deals issued by a plurality of businesses, identifying a plurality of performance data items relating to the plurality of previous deals, filtering the plurality of previous deals to identify a plurality of previous deal characteristics, selecting a plurality of high performance deal characteristics from the plurality of previous deal characteristics, generating a plurality of deal characteristics for the deal, identifying a first deal provider and a second deal provider from a plurality of deal providers, generating the deal including the plurality of deal characteristics, receiving an approval of the deal, and transmitting the deal to the first deal provider and the second deal provider.

3 Claims, 9 Drawing Sheets

METHOD AND SYSTEM FOR GENERATING DEALS FOR A BUSINESS USING A SOFTWARE APPLICATION

BACKGROUND

In the last fifteen years, the Internet has become a powerful marketing and distribution channel for businesses. Instead of simply relying on traditional means of marketing and distributing their product and services, businesses may now utilize the Internet to reach a huge customer base with relative ease. One innovation that has enabled this paradigm shift is the online deal. The online or group buying deal is facilitated by deal providers, which are companies specializing in the marketing and distribution of deals on products and services of business (in particular small and medium sized businesses, or SMBs).

Deal providers provide, through a website, deals on products and services of business to consumers that may redeem these deals within a certain timeframe (e.g. a year). For example, a deal provider may partner with a SMB (e.g. a yoga studio) to offer a deal on a service (e.g. a session of yoga at the yoga studio). In return for offering the deal to the customer base available to the deal provider, the deal provider may take a percentage of revenues that are generated by the deal (typically 50%). The deal will be structured in such a way that new customers may be introduced to the SMB (i.e. customers that otherwise may not have ever known of the existence of the SBM without the deal). The group buying portion of a deal includes an activation threshold for a number of customers to purchase a deal. In other words, if a certain number of customers do not buy the deal, the deal may not become "active". Deal providers, through the use of deals, have become a major new marketing and distribution channel for SMBs.

SUMMARY

In general, in one aspect, the invention relates to a method for generating a deal for a business in a particular industry, including identifying, using a processor, a deal goal of the business, where the deal goal identifies an outcome desired by the business for the deal, obtaining a plurality of previous deals issued by a plurality of businesses in the particular industry, identifying a plurality of performance data items relating to the plurality of previous deals, filtering, using the processor, the deal goal, and the plurality of performance data items, the plurality of previous deals to identify a plurality of previous deal characteristics, selecting a plurality of high performance deal characteristics from the plurality of previous deal characteristics, where the plurality of high performance deal characteristics exceeds a plurality of performance thresholds, generating, using the processor and the plurality of high performance deal characteristics, a plurality of deal characteristics for the deal, identifying, based on the plurality of deal characteristics, a first deal provider and a second deal provider from a plurality of deal providers, generating, using the processor and for the business, the deal including the plurality of deal characteristics, receiving, from a member of the business, an approval of the deal, and transmitting the deal to the first deal provider and the second deal provider.

In general, in one aspect, the invention relates to a system for generating a deal for a business in a particular industry, including a processor; and a deal recommendation application executing on the processor and configured to identify a deal goal of the business, where the deal goal identifies an outcome desired by the business for the deal, obtain a plurality of previous deals issued by a plurality of businesses in the particular industry, identify a plurality of performance data items relating to the plurality of previous deals, filter, using the deal goal and the plurality of performance data items, the plurality of previous deals to identify a plurality of previous deal characteristics, select a plurality of high performance deal characteristics from the plurality of previous deal characteristics, where the plurality of high performance deal characteristics exceeds a plurality of performance thresholds, generate, using the plurality of high performance deal characteristics, a plurality of deal characteristics for the deal, identify, based on the plurality of deal characteristics, a first deal provider and a second deal provider from a plurality of deal providers, generate, for the business, the deal including the plurality of deal characteristics, receive, from a member of the business, an approval of the deal, and transmit the deal to the first deal provider and the second deal provider.

In general, in one aspect, the invention relates to a non-transitory computer readable storage medium storing instructions for generating a deal for a business in a particular industry, the instructions executable on a processor and including functionality for identifying a deal goal of the business, where the deal goal identifies an outcome desired by the business for the deal, obtaining a plurality of previous deals issued by a plurality of businesses in the particular industry, identifying a plurality of performance data items relating to the plurality of previous deals, filtering, using the deal goal and the plurality of performance data items, the plurality of previous deals to identify a plurality of previous deal characteristics, selecting a plurality of high performance deal characteristics from the plurality of previous deal characteristics, where the plurality of high performance deal characteristics exceeds a plurality of performance thresholds, generating, using the plurality of high performance deal characteristics, a plurality of deal characteristics for the deal, identifying, based on the plurality of deal characteristics, a first deal provider and a second deal provider from a plurality of deal providers, generating, for the business, the deal including the plurality of deal characteristics, receiving, from a member of the business, an approval of the deal; and transmitting the deal to the first deal provider and the second deal provider.

Other aspects of the invention will be apparent from the following description and the appended claims.

DETAILED DESCRIPTION

Figure 1:
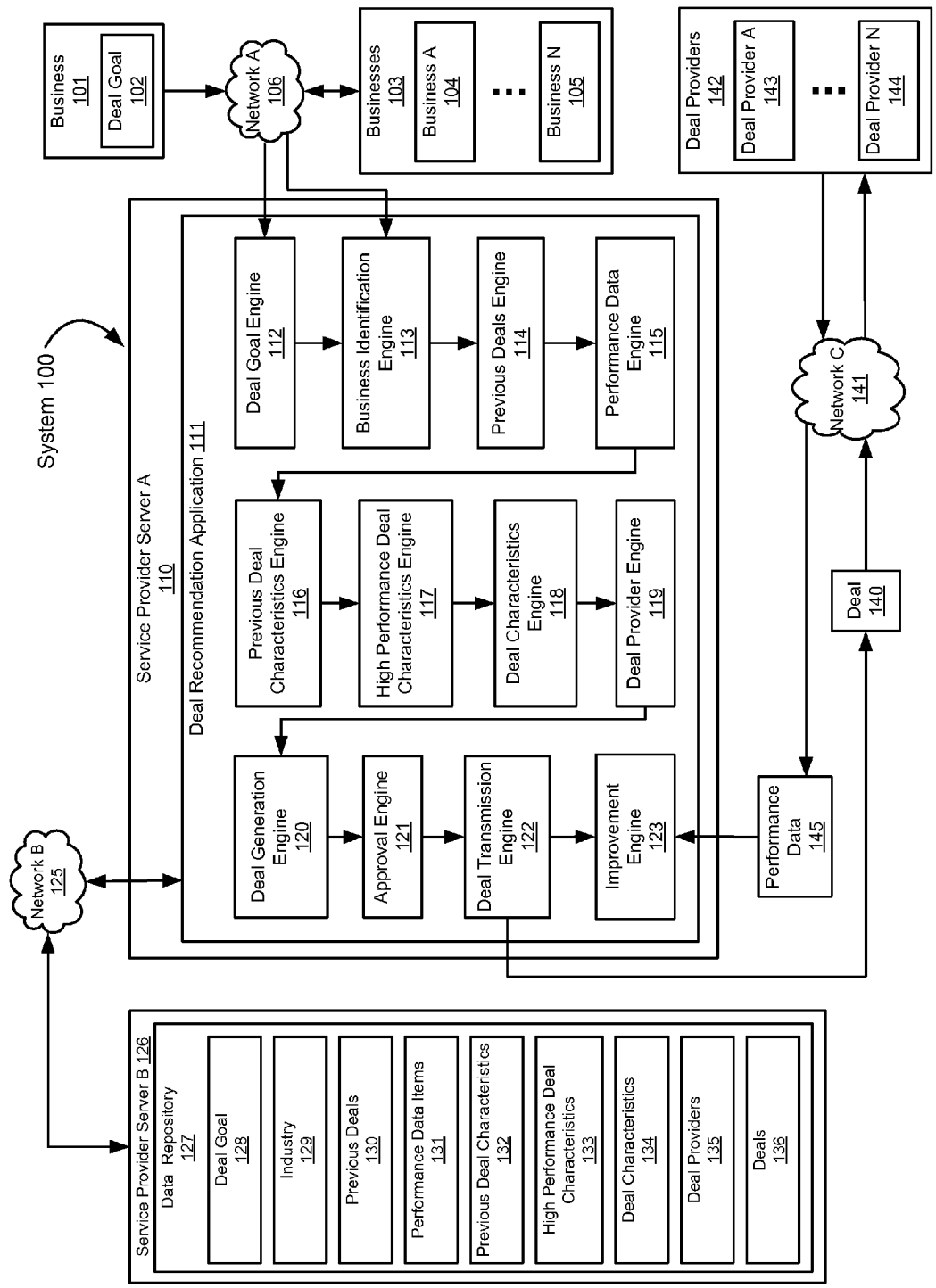
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for generating a recommendation for a deal. Specifically, a deal recommendation application may interface with a set of businesses, generate deals for these businesses, and then store analytics associated with the deals indicating how well the deals performed. The application may then generate a deal for another business in the same industry as previously issued deals, and base the deal on the best performing set of previously issued deals utilizing data sets of in-memory analytics of current and past deal performance attributes.

FIG. 1 shows a system (100) in accordance with one or more embodiments of the invention. As shown in FIG. 1, the system (100) includes components such as a business (101), businesses (103), deal providers (142), a deal recommendation application (111), and a data repository (127). These components are described below and may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet, a wide area network (WAN), or a local area network (LAN)), with wired and/or wireless segments. In one or more embodiments of the invention, there may be more than one deal recommendation application and data repository running on a device, as well as more than one business and deal provider interfacing with those components.

In one or more embodiments of the invention, a business (101) is an entity that sells goods and/or services to customers, and uses the deal recommendation application (111) to generate, deliver, and ultimately transact upon the deal presented. A deal is a promotion that is distributed and delivered using online (i.e. via the Internet) and telecommunication (e.g. wireless carriers) mediums by deal providers. The business (101) uses the deal providers' services to sell a product or service at a discount for a specified period of time, through an online or mobile related context. The business (101) may determine the structure of the deal generated by the deal recommendation application (111), and may provide a deal goal (102) to the deal recommendation application (111). The deal goal (102) is a mandate by the business relating to how a deal should be structured, and the desired outcome of the deal. For instance, a deal goal may require that any deal issued for the business maximize revenues on sales of a product for the business, maximize the number of customers that purchase the deal through incentivizing measures, minimize the number of customer service personnel required to handle customers of the deal, increase revenues during a seasonally slow time of the year, and so forth. The business (101) may operate within a particular industry, where the industry of the business (101) is the market within which the business operates. For example, a business may operate within the high-tech industry, the biotechnology industry, the basic resources industry, and so forth. The business (101) may provide the deal goal (102) to the deal recommendation application (111) via a network (106).

In one or more embodiments of the invention, businesses (103) are also commercial entities that sell goods and/or services to customers. The businesses (103) (e.g. business A (104), business N (105)) are also users of the deal recommendation application (111); however, unlike the business (101), the businesses (103) have already generated and issued deals using the deal recommendation application (111). The previously issued deals are stored in a data repository (127), as is performance data relating to the previous deals received from deal providers (142). When the businesses (103) generate deals using the deal recommendation application (111), the businesses (103) interface with the deal recommendation application (111) using a network A (106).

In one or more embodiments of the invention, a service provider server A (110) is configured to host the deal recommendation application (111), which is configured to generate a unique deal for a business based on specific inputs provided by that business (e.g. constraints set forth by the business related to a desired deal outcome). The deal recommendation application (111) is a software application that includes several engines configured to perform specific functions to recommend and generate a deal. Specifically, engines operating as part of the deal recommendation application (111) may include functionality to receive a deal goal, obtain previous deals, obtain performance data items, identify previous deal characteristics, select high performance deal characteristics, generate deal characteristics, identify deal providers, generate a deal, and transmit the deal to the deal providers. The engines may also perform other calculations associated with generating and transmitting a deal.

In one or more embodiments of the invention, the engines of the deal recommendation application (111) may include a deal goal engine (112), a business identification engine (113), a previous deals engine (114), a performance data engine (115), a previous deal characteristics engine (116), a high performance deal characteristics engine (117), a deal characteristics engine (118), a deal provider engine (119), a deal generation engine (120), an approval engine (121), a deal transmission engine (122), and an improvement engine (123). The deal recommendation application (111) may receive input from various sources, including the business (101), the businesses (103), and the deal providers (142). The deal recommendation application (111) may store and/or access data in/from the data repository (127). The service provider server A (110), deal recommendation application (111), and other data stored on the service provider server A (110) may be owned and/or operated by a service provider (e.g. the owner, developer, and/or manager of the deal recommendation application). Each engine of the deal recommendation application (111) is described below. Those skilled in the art will appreciate that each of the engines described may have other functionality beyond that disclosed, and that the functionality of each engine may alternatively be performed by any of the other engines.

In one or more embodiments of the invention, a deal goal engine (112) is configured to receive inputs related to generating a deal goal (102) from the business (101). The deal goal engine (112) may receive the inputs related to the deal goal (102) from the business (101) over network A (106). After receiving the inputs related to the deal goal (102), the deal goal engine (112) may process (i.e. modify, transform, format) the deal goal (102), and then transmit the deal goal (102) to the business identification engine (113) for further processing. In parallel, the deal goal engine (112) may pass control of the system (100) to any other engine of the deal recommendation application (111). Those skilled in the art will appreciate that the deal goal engine (112) may receive the inputs and the deal goal (102) from other entities beyond the business (101), and may perform other functions beyond those disclosed. Further, the deal goal (102) may be generated based on inputs collected by a deal provider (e.g. the deal provider A (143)) that relate to a business mandate.

In one or more embodiments of the invention, a business identification engine (113) is configured to identify other businesses in the industry of the business (101) that have previously issued deals using the deal recommendation application (111). The business identification engine (113) may receive the particular industry of the business (101) from the deal goal engine (112). After receiving the industry and identifying a set of businesses in that industry, the business identification engine (113) may transmit the identities of the businesses in the industry to the previous deals engine (114) for further processing. In parallel, the business identification engine (113) may pass control of the system (100) to any other engine of deal recommendation application (111). Those skilled in the art will appreciate that the business identification engine (113) may receive the industry of the business (101) from other entities beyond the deal goal engine (112), and may perform other functions beyond those disclosed.

In one or more embodiments of the invention, a previous deals engine (114) is configured to obtain previous deals issued by the businesses (103). Previous deals have been recommended, generated, and/or transmitted by the deal recommendation application (111) in the past on behalf of businesses (103) to deal providers (142). The previous deals engine (114) may obtain the previous deals from a data repository (127) after receiving the identities of the businesses from the business identification engine (113). After obtaining the previous deals, the previous deals engine (114) may process (i.e. modify, transform, format) the previous deals, and then transmit the previous deals to the performance data engine (115) for further processing. In parallel, the previous deals engine (114) may pass control of the system (100) to any other engine of deal recommendation application (111). Those skilled in the art will appreciate that the previous deals engine (114) may receive the identities of the businesses (103) from other entities beyond the business identification engine (113), and may perform other functions beyond those disclosed.

In one or more embodiments of the invention, a performance data engine (115) is configured to obtain performance data items relating to the previous deals. Specifically, the performance data engine (115) may receive previous deals from the previous deals engine (114), and then obtain the performance data items using the previous deals. Performance data items provide an indication of the effectiveness of an issued deal. For example, performance data items may include total deal revenue, total number of deals sold, total number of customers, and so forth. Those skilled in the art will appreciate that performance data items obtained by the performance data engine (115) are distinct from the performance data (145). Specifically, the performance data (145) relates to the current deal associated with the business (101), whereas the performance data items obtained by the performance data engine (115) relate to previous deals associated with the businesses (103). After obtaining the performance data items, the performance data engine (115) may process (i.e. modify, transform, format) the performance data items, and then transmit the performance data items to the high performance deal characteristics engine (117) for further processing. In parallel, the performance data engine (115) may pass control of the system (100) to any other engine of deal recommendation application (111). Those skilled in the art will appreciate that the performance data engine (115) may receive previous deals from other entities beyond the previous deals engine (114), and may perform other functions beyond those disclosed.

In one or more embodiments of the invention, a previous deal characteristics engine (116) is configured to filter previous deals to identify previous deal characteristics. Previous deals may be filtered using the deal goal and performance data items. Previous deal characteristics are features of previous deals that describe the previous deals. For example, previous deal characteristics may include the name of sale items, the discounts on the sale items to customers, the deal prices, the launch dates, the launch times, and so forth. The previous deal characteristics engine (116) may receive previous deals from the previous deals engine (114). After identifying previous deal characteristics, the previous deal characteristics engine (116) may process (i.e. modify, transform, format) the previous deal characteristics, and then transmit the previous deal characteristics to the high performance deal characteristics engine (117) for further processing. In parallel, the previous deal characteristics engine (116) may pass control of the system (100) to any other engine of deal recommendation application (111). Those skilled in the art will appreciate that the previous deal characteristics engine (116) may receive previous deals from other entities beyond the previous deals engine (114), and may perform other functions beyond those disclosed.

In one or more embodiments of the invention, a high performance deal characteristics engine (117) is configured to select high performance deal characteristics from the previous deal characteristics that exceed performance thresholds. Performance thresholds specify limits that previous deal characteristics must exceed or satisfy in order to become high performance deal characteristics. For example, performance thresholds may specify that total deal revenue must exceed $50,000, total number of deals sold must exceed 300, and total number of customers must exceed 600 for a set of previous deal characteristics to be classified as high performance deal characteristics. Thus, high performance deal characteristics are previous deal characteristics that are selected because they pass a performance threshold relating to data obtained from the deal service provider. Those skilled in the art will appreciate that the performance threshold may be defined by the business.

In one or more embodiments of the invention, the high performance deal characteristics engine (117) may receive previous deal characteristics from previous deal characteristics engine (116), and the performance data items from the performance data engine (115). After selecting high performance deal characteristics, the high performance deal characteristics engine (117) may process (i.e. modify, transform, format) the high performance deal characteristics, and then transmit the high performance deal characteristics to the deal characteristics engine (118) for further processing. In parallel, the high performance deal characteristics engine (117) may pass control of the system (100) to any other engine of deal recommendation application (111). Those skilled in the art will appreciate that the high performance deal characteristics engine (117) may receive previous deal characteristics and performance data items from other entities beyond the previous deal characteristics engine (116) and the performance data engine (115), respectively, and may perform other functions beyond those disclosed.

In one or more embodiments of the invention, a deal characteristics engine (118) is configured to generate deal characteristics using the high performance deal characteristics. Deal characteristics are features of a deal that are recommended to a business by the deal recommendation application (111). The deal characteristics engine (118) may receive the high performance deal characteristics from the high performance deal characteristics engine (117). After generating deal characteristics, the deal characteristics engine (118) may process (i.e. modify, transform, format) the deal characteristics, and then transmit the deal characteristics to the deal provider engine (119) for further processing. In parallel, the deal characteristics engine (118) may pass control of the system (100) to any other engine of deal recommendation application (111). Those skilled in the art will appreciate that the deal characteristics engine (118) may receive high performance deal characteristics from other entities beyond the high performance deal characteristics engine (117), and may perform other functions beyond those disclosed.

In one or more embodiments of the invention, a deal provider engine (119) is configured to identify deal providers (142) using the deal characteristics. A deal provider is a commercial entity that acts as a distribution channel for deals online. For example, a deal provider may sell a deal per day per geographical region, and take a percentage of the profits generated by that deal. The deal provider engine (119) may receive the deal characteristics from the deal characteristics engine (118). After identifying deal providers, the deal provider engine (119) may transmit the deal providers to the deal generation engine (120) for further processing. In parallel, the deal provider engine (119) may pass control of the system (100) to any other engine of deal recommendation application (111). Those skilled in the art will appreciate that the deal provider engine (119) may receive the deal characteristics from other entities beyond the deal characteristics engine (118), and may perform other functions beyond those disclosed.

In one or more embodiments of the invention, a deal generation engine (120) is configured to generate a deal (140) for the business. The deal (140) includes the deal characteristics. The deal generation engine (120) may receive the deal characteristics from the deal characteristics engine (118). After generating the deal, the deal generation engine (120) may process (i.e. modify, transform, format) the deal, and then transmit the deal (140) to the approval engine (121) for further processing. In parallel, the deal generation engine (120) may pass control of the system (100) to any other engine of deal recommendation application (111). Those skilled in the art will appreciate that the deal generation engine (120) may receive deal characteristics from other entities beyond the deal characteristics engine (118), and may perform other functions beyond those disclosed.

In one or more embodiments of the invention, an approval engine (121) is configured to receive an approval of the deal (140). The approval may be received from a business (101) for which the deal (140) was generated. After receiving the approval, the approval engine (121) may process (i.e. modify, transform, format) the deal (140), and then transmit the deal (140) to the deal transmission engine (122) for further processing. In parallel, the approval engine (121) may pass control of the system (100) to any other engine of deal recommendation application (111). Those skilled in the art will appreciate that the approval engine (121) may receive an approval from other entities beyond the business (101), and may perform other functions beyond those disclosed.

In one or more embodiments of the invention, a deal transmission engine (122) is configured to transmit the deal (140) to the deal providers. The transmission may be performed electronically (i.e. over a network and/or the Internet). The deal transmission engine (122) may receive the deal (140) and the approval from the approval engine (121). The deal (140) may be transmitted to deal providers A (143) through N (144) of the deal providers (142) through network C (141). After transmitting the deal (140), the deal transmission engine (122) may receive feedback from the deal providers through the improvement engine (123). At this point, the deal transmission engine (122) may pass control of the system (100) to any engine of deal recommendation application (111). Those skilled in the art will appreciate that the deal transmission engine (122) may receive a deal and an approval from other entities beyond the approval engine (121), and may perform other functions beyond those disclosed.

In one or more embodiments of the invention, an improvement engine (123) is configured to receive performance data (145) for a deal (140) from deal providers. The performance data (145) may be received from deal providers A (143) through N (144) of the deal providers (142) through network C (141). After receiving performance data (145), the improvement engine (123) may process (i.e. modify, transform, format) the performance data (145), add the deal (140) to the set of previous deals in the deal recommendation application (111), and add the performance data (145) to the set of performance data items. Subsequently, the improvement engine (123) may pass control of the system (100) to any engine of deal recommendation application (111). Those skilled in the art will appreciate that the improvement engine (123) may receive performance data (145) from other entities beyond deal providers, and may perform other functions beyond those disclosed.

In one or more embodiments of the invention, a service provider server B (126) is configured to host a data repository (127). The data repository (127) may contain data associated with the deal recommendation application (111). The data repository may be a relational database that stores data entries associated with the deal recommendation application (111). The data repository (127) may also be a spreadsheet containing data cells associated with the deal recommendation application (111). In one or more embodiments of the invention, the data repository (127) may be implemented with many technologies.

In one or more embodiments of the invention, the data repository (127) may receive data from various sources, including the deal recommendation application (111), and any of the engines of the deal recommendation application (111), over network B (125). After receiving data from the deal recommendation application (111), the data repository (127) may process (i.e. modify, transform, format) the data, and then store the data. The data repository (127) may contain a deal goal (128), an industry (129), previous deals (130), performance data items (131), previous deal characteristics (132), high performance deal characteristics (133), deal characteristics (134), deal providers (135), and deals (136). Those skilled in the art will appreciate that the data repository (127) may receive and store data from other entities beyond the deal recommendation application (111), and may perform other functions beyond those disclosed. Further, the service provider server B (126), and the data stored on this server may be owned and/or operated by a service provider (e.g. the owner, developer, and/or manager of the deal recommendation application).

In one or more embodiments of the invention, a GUI (not shown) may display information associated with the deal recommendation application (111). The GUI may be viewed in a web browser, an application window, and the like. The GUI may be viewed in these display technologies by a user (e.g. an employee of a business (101)) of the deal recommendation application (111). The GUI may include standard web elements, including video, audio, and text, as well as interface technologies not limited to text submission on forms, voice capture, and user gesture interpretation. In one or more embodiments of the invention there may be various other display technologies used to view the GUI.

Figure 2:
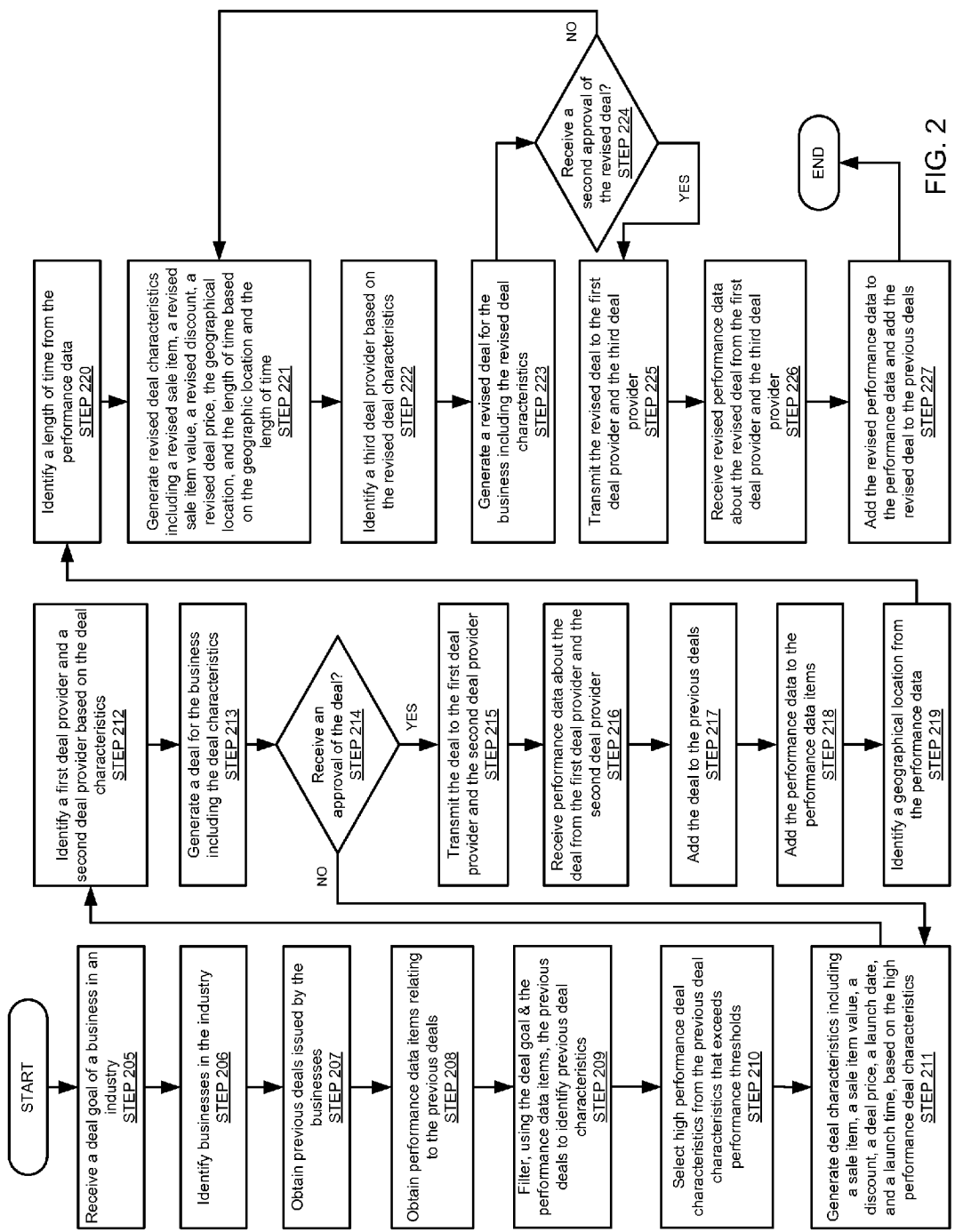
FIG. 2 shows a flowchart in accordance with one or more embodiments of the invention.

FIG. 2 shows a flowchart in accordance with one or more embodiments of the invention. The process shown in FIG. 2 may be used, for example, with the system (100) of FIG. 1, to generate a recommendation of a deal for a business. The sequence of steps shown in FIG. 2 may differ among embodiments of the invention, and one or more of the steps may be performed in parallel and/or may be optional.

In STEP 205, a deal goal is received from a business in an industry. The deal goal specifies an outcome desired by the business for the deal. For example, a deal goal may include maximizing the revenue generated by the deal, or minimizing the number of employees required to support customers of the deal (e.g. extra servers at a cupcake store required to be present on a redemption day of a deal for cupcakes in order to manage a greater number of customers than usual). In this example, the particular industry may be boutique cupcakes, and the business may be a boutique cupcake store called "Sue's Cupcakes".

In STEP 206, other businesses in the industry are identified. For example, other boutique cupcake stores comparable to Sue's Cupcakes may be identified. In this case, the other businesses operate in the same industry as Sue's Cupcakes (i.e. the boutique cupcake industry). There may also be other metrics used to identify and filter the set of businesses. For instance, geographical vicinity to Sue's Cupcakes, revenues (e.g. similar to the revenues of Sue's Cupcakes), profit margins (e.g. similar to the profit margins of Sue's Cupcakes), volume of customers (e.g. similar to the volume of customers of Sue's Cupcakes), and so forth.

In STEP 207, previous deals issued by the other businesses are obtained. These previous deals may be stored in, for example, a data repository of the deal recommendation application. The previous deals are deals of the businesses that have been identified to be in the same industry as Sue's Cupcakes. Since previous deals related to the same industry as Sue's Cupcakes are obtained, the previous deals may yield some insights for determining effective deal characteristics, which may then be utilized to generate a more effective deal for Sue's Cupcakes.

In STEP 208, performance data items relating to the previous deals are obtained. Performance data items of the previous deals indicate the effectiveness of the previous deals, after being marketed by deal providers and purchased by customers. The performance data items may be stored in, for example, a data repository of the deal recommendation application. Therefore, the performance data items represent a pool of data that indicates how well the previous deals performed when activated. For example, a performance data item may indicate that the total revenue derived from a previous deal in the boutique cupcake market was $75,000. Performance data items may relate to any aspect of a deal (e.g. customers, time period, sale item, locations, placement within a deal provider website, and so forth).

In STEP 209, the previous deals are filtered using the deal goal and the performance data items to identify previous deal characteristics. For example, if Sue's Cupcakes had a deal goal to maximize revenues of a deal, then a set of previous deal characteristics that produced outcomes consistent with the deal goal are selected. Specifically, if there are three previous deals in the boutique cupcakes industry that each have a set of previous deal characteristics (e.g. sale item, sale item value, discount to customers, deal price, locations, and so forth), the previous deal characteristics of the two previous deals that produced the greatest total revenues for their respective deals may be selected, and the previous deal with the lowest revenue may be excluded.

In STEP 210, high performance deal characteristics are selected from the previous deal characteristics that exceed a set of performance thresholds. For example, if a performance threshold indicates that total deal revenues are required to exceed $50,000, then the previous deal characteristics associated with the deal that has a total revenue that exceeds $50,000 (e.g. $75,000) will be selected as high performance deal characteristics. On the other hand, previous deal characteristics associated with the deal that has a total revenue that does not exceed $50,000 (e.g. $35,000) will not be selected as high performance deal characteristics.

In STEP 211, deal characteristics are generated, based on the high performance deal characteristics. For example, deal characteristics including a sale item (e.g. "chocolate cupcake"), a sale item value (e.g. "$2"), a discount (e.g. "50%"), a deal price (e.g. "$1"), a launch date (e.g. "Jun. 1, 2011"), and a launch time (e.g. "12:00 PM") may be generated for Sue's Cupcakes. These deal characteristics may be a mix of, or based on, the previous deal characteristics of several previous deals.

In STEP 212, a first deal provider and a second deal provider are identified. For example, deal providers that are known to work with companies in the boutique cupcake industry may be selected. These deal providers may be selected from a group of deal providers known to the deal recommendation application. Specifically, each deal provider in the group of deal providers may be categorized according to industry, revenues, customers, geographical reach, language, country, and so forth.

In STEP 213, a deal is generated. The deal contains the set of deal characteristics that were generated in STEP 211. For example, a deal containing the following deal characteristics may be generated: sale item ("chocolate cupcake"), sale item value ("$2"), discount ("50%"), deal price ("$1"), launch date ("Jun. 1, 2011"), launch time ("12:00 PM"), deal providers ("Gigantic Deal Provider, Local Deal Provider"), locations ("San Francisco, Calif., New York, N.Y."), minimum number of deals for deal activation ("100"), maximum number of deals sold before end of deal ("200"), timeframe ("24 hours"), deal provider placement level ("medium"), limitations ("2 deals per customer"), split of profits with deal providers ("40%"), recurring timeperiod ("2 months"), frequency of recurring deals ("2 per month"), deal redemption period ("Jun. 1, 2011-Aug. 1, 2011"), and special staffing details ("none. maintain staff during deal redemption period"). Each of these deal characteristics will be explained in further detail in the example of FIG. 5A.

Those skilled in the art will appreciate that the deal may also be generated using information about the business. For example, this information may include average customer spend per visit to the business, retention rates, estimated life time value per customer, size of the business, nature of the business, profitability of the business, fixed cost versus variable costs mix of the business, buffer capacity in operations of the business, and so forth. Further, the deal may be generated using additional information from the other businesses in the industry. For example, this additional information may include the sizes of the other businesses, the revenues of the other businesses, the margins of the other businesses, and so forth. In addition, other demographic information, provided by the business, or the deal recommendation application, may be used to generate the deal. This information may include target demographic information such as age, gender, target geographical location, interests, previous deals purchased, and so forth.

In STEP 214, it is determined if an approval of the deal is received. If the approval is received, then the process proceeds to STEP 215, otherwise the process proceeds back to STEP 211.

In STEP 215, the deal is transmitted to the first deal provider and the second deal provider. For example, the deal for Sue's Cupcakes may be transmitted to the Gigantic Deal Provider and the Local Deal Provider via a network (e.g. the Internet). Once these deal providers have received the deal, they may market the deal on their respective websites, and split the revenues generated by customer purchases of chocolate cupcakes with Sue's Cupcakes. The deal providers may also perform analytics on the deal, and keep track of how the deal performs according to various metrics (i.e. performance data).

In STEP 216, performance data about the deal is received from the first deal provider and the second deal provider. For example, performance data may include various metrics that can be used to determine how well the deal performed, such as total deal revenue (e.g. "$60,000"), total number of deals sold (e.g. "800"), total number of customers (e.g. "600"), average customer spend per deal (e.g. "$100"), deal provider with most sales (e.g. "Local Deal Provider"), and so forth. Performance data will be explained further in the description of FIG. 5A.

In STEP 217, the deal is added to the set of previous deals. For example, the deal for Sue's Cupcakes that was marketed by the Gigantic Deal Provider and the Local Deal Provider is added to the previous deals already executed by the deal recommendation application. Therefore, the Sue's Cupcakes deal now becomes part of the "database of deals" that the deal recommendation application can access and use for future deal generation, recommendation, and execution.

In STEP 218, the performance data is added to the set of performance data items. For example, the performance data relating to the deal for Sue's Cupcakes that was marketed by the Gigantic Deal Provider and the Local Deal Provider is added to the performance data items stored previously by the deal recommendation application. Therefore, the performance data associated with Sue's Cupcakes deal now becomes part of the "database of performance data items" that the deal recommendation application can access and use for future deal generation, recommendation, and execution.

In STEP 219, a geographic location is identified from the performance data. For example, the performance data may indicate that the Sue's Cupcakes deal performed best (e.g. by number of deals sold) in San Francisco, Calif. and worst in New York, N.Y.

In STEP 220, a length of time is identified from the performance data. For example, the performance data may indicate that 10 hours passed before the deal was activated (e.g. due to a threshold number of customers purchasing the deal).

In STEP 221, revised deal characteristics are generated. For example, revised deal characteristics including a revised sale item (e.g. "coconut cupcake"), a revised sale item value (e.g. "$2.2"), a revised discount (e.g. "50%"), a revised deal price (e.g. "$1.1"), the geographic location (e.g. "San Francisco, Calif."), and the target length of time (e.g. "9 hours") may be generated for Sue's Cupcakes. These revised deal characteristics may me a mix of, or based on, the deal characteristics of the previous Sue's Cupcakes deal.

In STEP 222, a third deal provider is identified. For example, a deal provider called "More Deals!" that has a more focused business presence in San Francisco, which may be a better choice than other deal providers for marketing deals in San Francisco. Further, "More Deals!" may have a better track record of marketing deals within the target length of time (i.e. 9 hours) than other competitor deal providers. The third deal provider may be chosen based on how well the deal provider executes deals with similar characteristics to the revised deals characteristics.

In STEP 223, a revised deal for the business is generated. The revised deal contains the set of revised deal characteristics that were generated in STEP 221. For example, a revised deal containing the following revised deal characteristics may be generated: revised sale item ("coconut cupcake"), revised sale item value ("$2.2"), revised discount ("50%"), revised deal price ("$1.1"), geographic location ("San Francisco, Calif."), the target length of time ("9 hours"), launch date ("Jun. 1, 2011"), launch time ("12:00 PM"), deal providers ("Local Deal Provider, More Deals!"), locations ("San Francisco, Calif."), minimum number of deals for deal activation ("100"), maximum number of deals sold before end of deal ("200"), timeframe ("24 hours"), deal provider placement level ("medium"), limitations ("2 deals per customer"), split of profits with deal providers ("40%"), recurring timeperiod ("2 months"), frequency of recurring deals ("2 per month"), deal redemption period ("Jun. 1, 2011-Aug. 1, 2011"), and special staffing details ("none. maintain staff during deal redemption period").

In STEP 224, it is determined if a second approval of the revised deal is received. If the second approval has been received, then the process proceeds to STEP 225, otherwise the process proceeds back to STEP 221.

In STEP 225, the revised deal is transmitted to the first deal provider and the third deal provider. For example, the revised deal for Sue's Cupcakes may be transmitted to the Local Deal Provider and More Deals! via a network (e.g. the Internet). Once the deal providers have received this deal, the deal providers may market the deal on their respective websites, and split the revenues generated by customer purchases of coconut cupcakes with Sue's Cupcakes. The deal providers may also perform analytics on the deal, and keep track of how the deal performs according to various metrics (i.e. revised performance data).

In STEP 226, revised performance data is received from the first deal provider and the third deal provider. For example, revised performance data may include various metrics that can be used to judge how well the deal performed, such as total deal revenue (e.g. "$70,200"), total number of deals sold (e.g. "900"), total number of customers (e.g. "450"), average customer spend/deal (e.g. "$78"), deal provider with most sales (e.g. "More Deals!"), and so forth.

In STEP 227, the revised performance data is added to the set of performance data, and the revised deal is added to the set of previous deals. For example, the revised performance data relating to the deal for Sue's Cupcakes that was marketed by the Local Deal Provider and More Deals! is added to the performance data items stored previously by the deal recommendation application. Therefore, the revised performance data associated with Sue's Cupcakes revised deal now becomes part of the "database of performance data items" that the deal recommendation application can access and use for future deal generation, recommendation, and execution. Further, the revised deal for Sue's Cupcakes that was marketed by the Local Deal Provider and More Deals! is added to the previous deals already executed by the deal recommendation application. Therefore, the revised Sue's Cupcakes deal now becomes part of the "database of deals" that the deal recommendation application can access and use for future deal generation. After STEP 227, the process may end.

Figure 3:
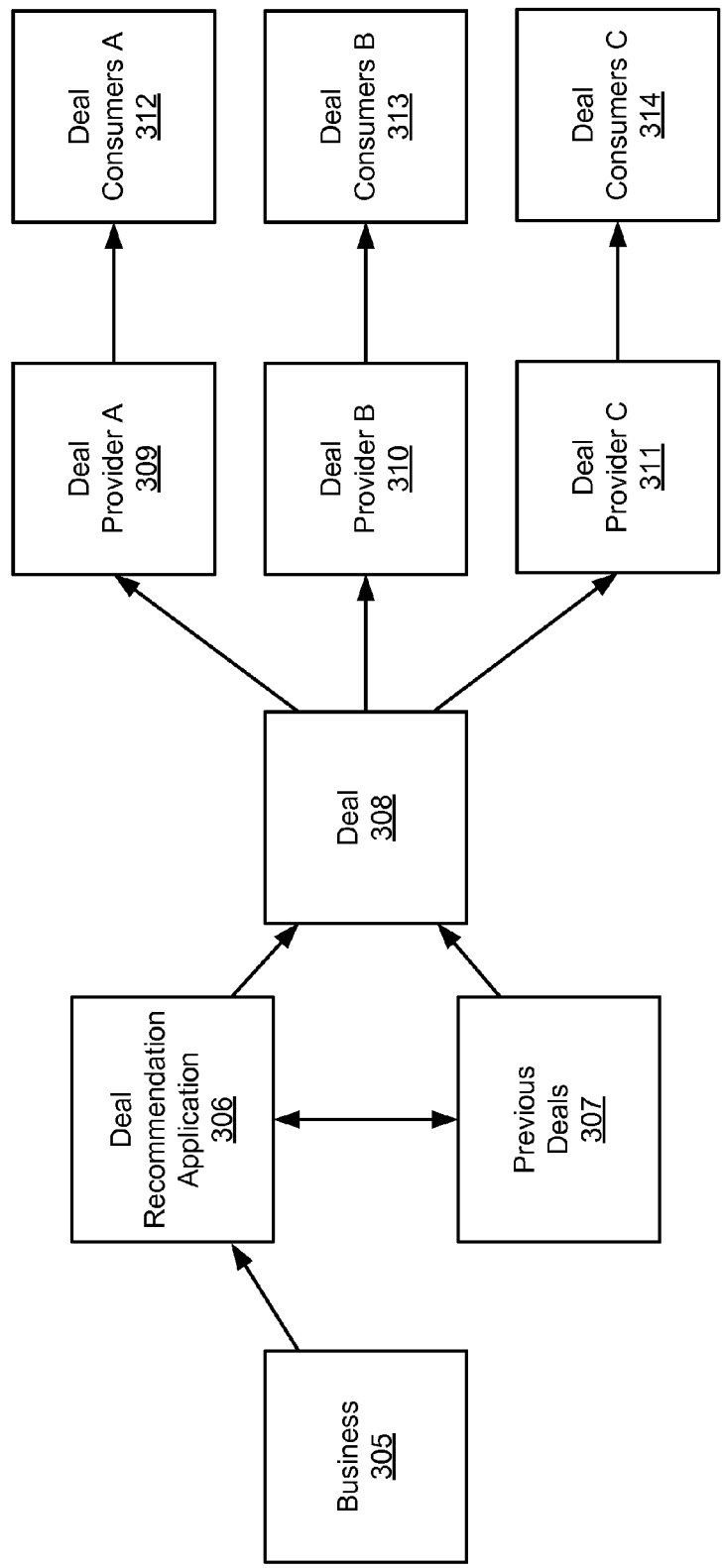
FIGS. 3, 4, 5A, 5B, 6A, and 6B show flow diagrams of examples in accordance with one or more embodiments of the invention.

FIG. 3 shows an example in accordance with one or more embodiments of the invention. The example shown in FIG. 3 may be used, for instance, with the system (100) of FIG. 1, to generate a deal and transmit the deal to deal consumers. The example shown in FIG. 3 may differ among embodiments of the invention, and one or more of the elements may be optional.

In FIG. 3, a business (305) uses the deal recommendation application (306) to generate a deal (308). The business (305)

may want to gain new customers (e.g. to grow revenue streams), or simply sell more of a particular product (e.g. to gain market share), and can use a deal as a marketing mechanism with which to accomplish its goals. The generation of the deal (308) may involve the use of previous deals (307) stored and managed by the deal recommendation application (306). Specifically, the deal recommendation application (306) may determine deal characteristics of the deal (308) based on previous deal characteristics of previous deals (307) from other businesses, perhaps in the same industry as the business (305). The previous deals should have performed well, using a deal goal provided by the business (305) as a metric for judging performance. The deal goal may be, for instance, to maximize revenues generated by the deal. The previous deals (307) selected will be those that performed well by this metric (e.g. the selected deals generated high revenues).

Once a deal has been generated, recommended to the business (305), and approval of the deal has been obtained from the business (305), the deal recommendation application (306) transmits the deal to various deals providers that were selected as partners for the deal during the deal generation phase. For example, the deal (308) may be sent to deal provider A (309), deal provider B (310), and deal provider C (311). The selected deal providers may be companies that specialize in marketing and distributing deals online (e.g. through their websites and other online means). The deal recommendation application (306) may accomplish the transmission of deals to deal providers by interfacing with the respective websites of the deal providers, for instance, through the use of an application programming interface (API). Deal providers may provide varying level of access to the deal recommendation application (306). For example, one deal provider may only allow the deal recommendation application (306) to upload a deal; however, another deal provider may allow the deal recommendation application (306) complete access to its system (e.g. analytics on deals, performance data, and so forth).

Deal providers A (309), B (310), and C (311) may be directed by the business (305) to achieve performance goals as judged by various metrics, where deal providers A (309), B (310), and C (311) each contribute to certain metrics in varying capacities. Specifically, the business (305) may interact with deal providers A (309), B (310), and C (311) through the deal recommendation application (306). For example, deal provider A (309) may be selected to reach an audience of consumers in a certain geographic region (e.g. Los Angeles), because deal provider A (309) is known to market deals well to consumers in the Los Angeles area. Similarly, deal provider B (310) may be selected to attract an audience of consumers that are known to spend much more than the deal price, and deal provider C (311) may be selected because it allows profit splits of less than 50%. In this manner, each deal provider may be selected in a way that best contributes to a business's deal goals (e.g. maximize revenue, maximize market penetration of a product through a deal, and so forth).

After the deal providers receive the deal (308) from the deal recommendation engine (306), they transmit the deal (308) to various deal consumers (e.g. deal consumers A (312), B (313), and C (314)). Deal consumers are individuals that purchase the deal (308) through the respective websites of the deal providers. After a certain time period, or a certain number of deals have been purchased, the deal providers may allow the deal recommendation application (306) to access performance data. Performance data will be discussed in more depth in the description of FIGS. 4 and 5A.

Figure 4:
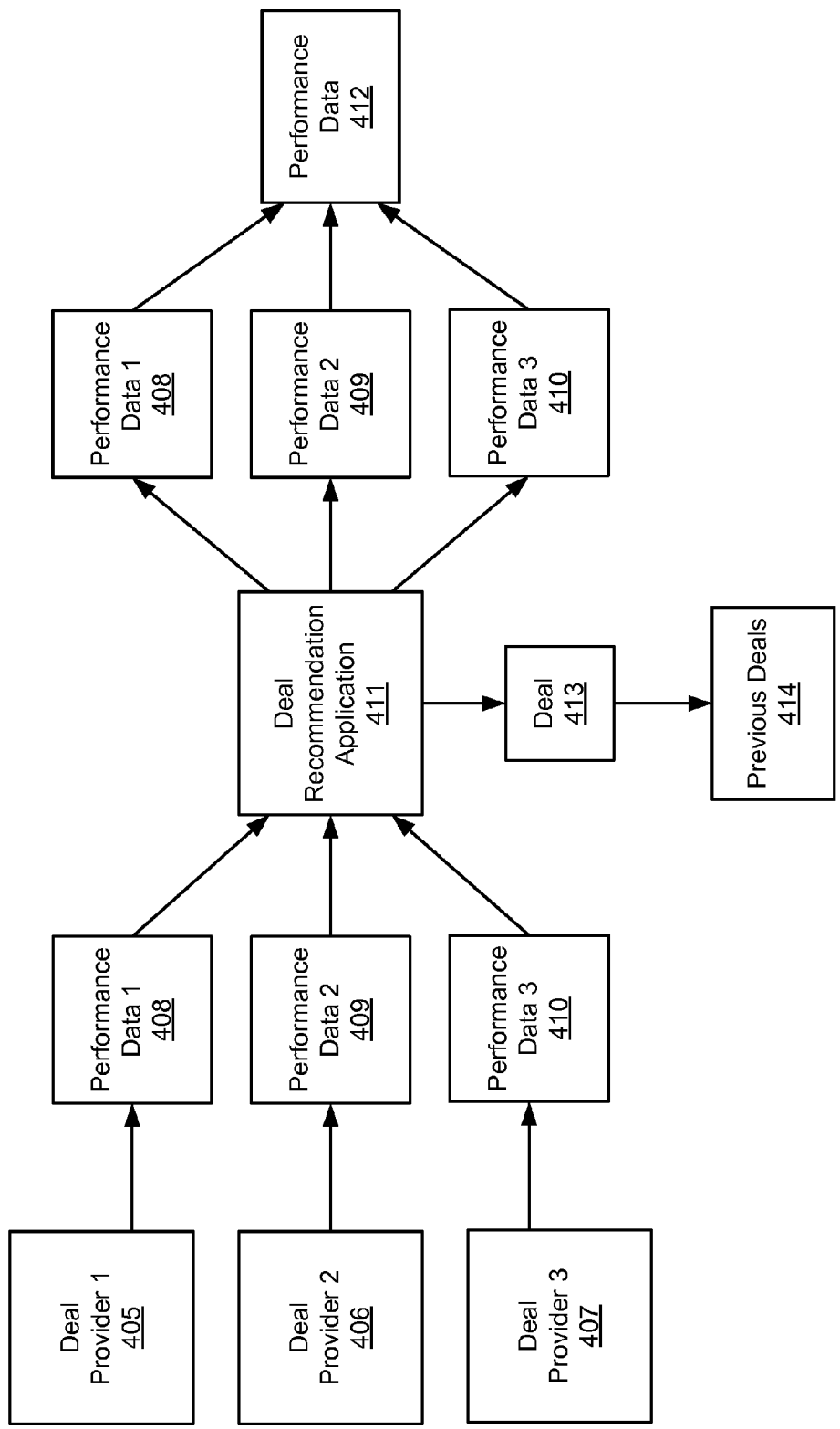

FIG. 4 shows an example in accordance with one or more embodiments of the invention. The example shown in FIG. 4 may be used, for instance, with the system (100), to receive and process performance data of a live deal. The example shown in FIG. 4 may differ among embodiments of the invention, and one or more of the elements may be optional.

In FIG. 4, deal providers 1 (405), 2 (406), and 3 (407) have received a deal from a deal recommendation application (411), and sufficient time has passed and/or a sufficient number of customers have purchased the deal such that the deal providers provide performance data back to the deal recommendation application (411). Performance data (e.g. performance data 1 (408), performance data 2 (409), and performance data 3 (410)) is any data that specifies how well or poorly a deal performed according to various metrics. The performance metrics may include total deal revenue, total number of deals sold, total number of customers, average customer spend per deal, average extra spend per deal, and so forth. Performance data will be discussed in greater detail in the description of FIG. 5A.

Once a deal provider transmits performance data to the deal recommendation application (411), the deal recommendation application (411) may process the performance data and store it with a pool of previously stored performance data of other deals. For example, performance data 1 (408), performance data 2 (409), and performance data 3 (410) may be stored with performance data (412), which is a set of performance data from previous deals marketed by the deal providers. In this way, performance data 1 (408), performance data 2 (409), and performance data 3 (410) (i.e. performance data of a current deal (413)) may be used along with previous performance data of previous deals from other businesses in an aggregate pool of performance data (412) for use in generating future deals.

Furthermore, the deal (413) itself may be stored by the deal recommendation application (411) in a pool of previous deals (414), also for use in generating future deals. Specifically, the deal characteristics of the deal (413) are stored and may be used to generate future deals. If the deal (413) performs well according to one or more metrics (e.g. revenue, number of employees required to support the deal, geographical reach, extra spend per deal, and so forth), then it may be retrieved from the previous deals (414) pool in the future and used in the generation of a future deal that has similar deal goals. Those skilled in the art will appreciate that there may be various other deal goals, metrics, deal characteristics, and performance data types than those that have been described.

Figure 5A:
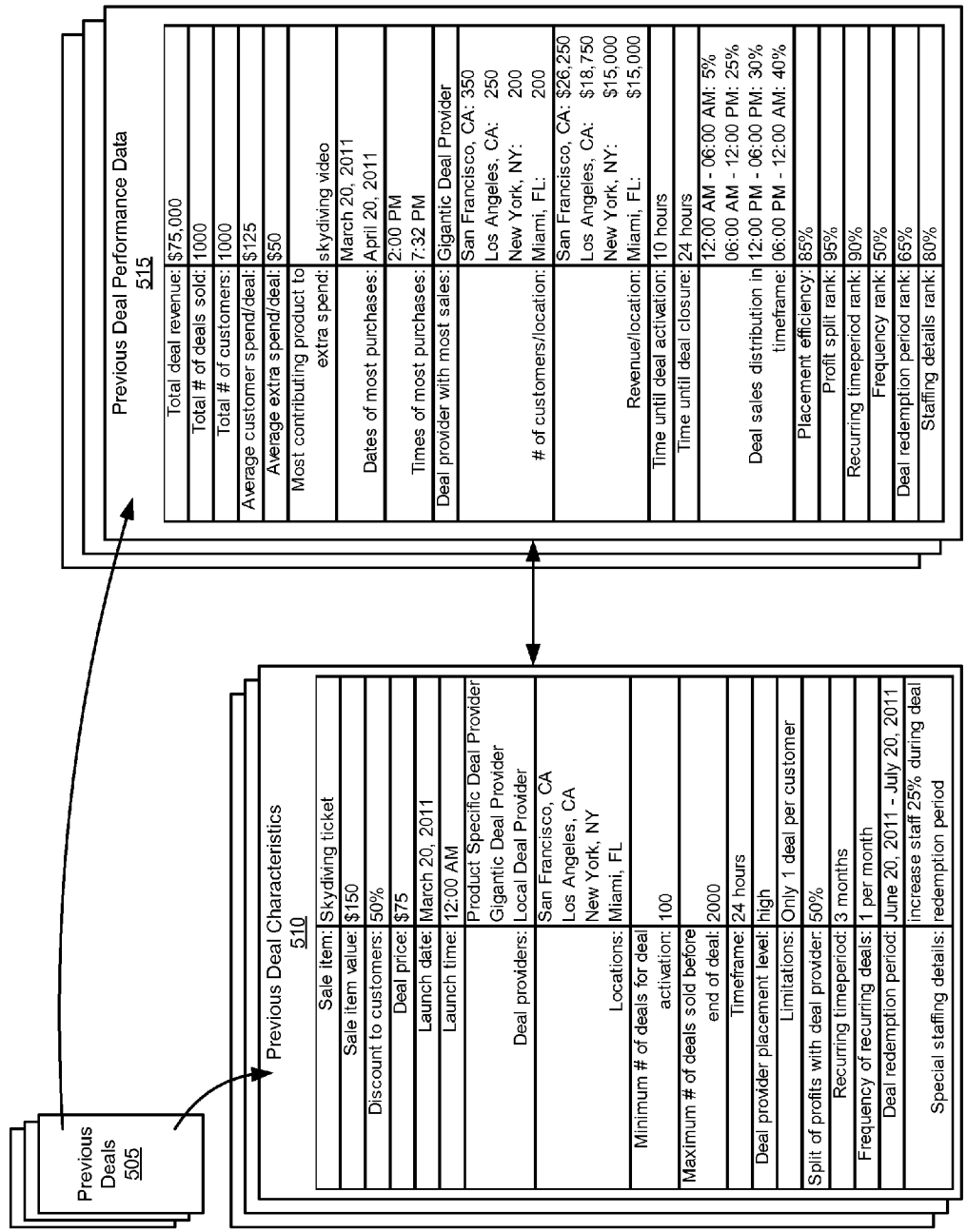
Figure 5B:
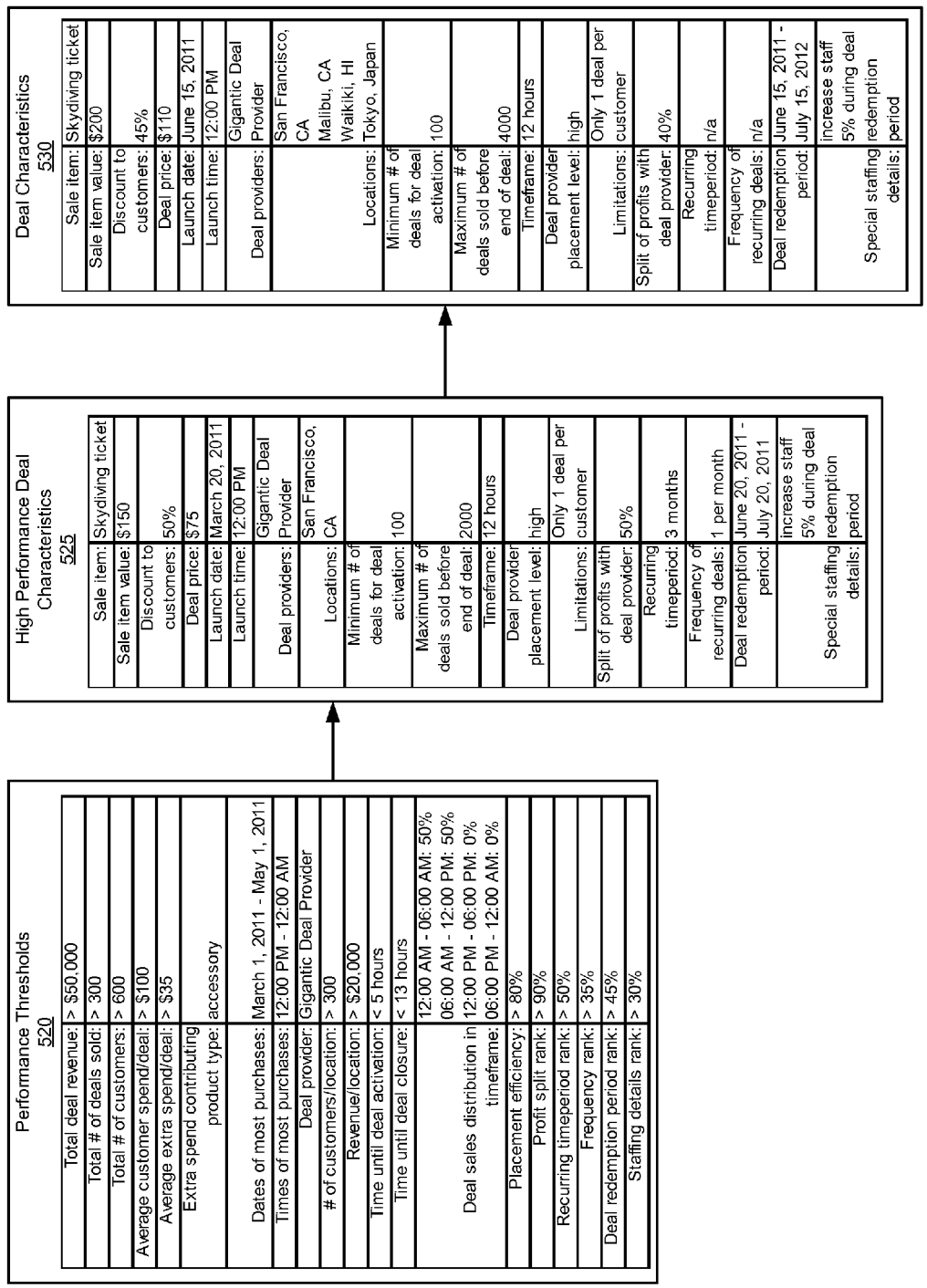

FIGS. 5A and 5B show examples in accordance with one or more embodiments of the invention. The examples shown in FIGS. 5A and 5B may be used, for instance, with the system (100) of FIG. 1, to generate a deal. The examples shown in FIGS. 5A and 5B may differ among embodiments of the invention, and one or more of the elements may be optional.

In FIG. 5A, previous deals (505), previous deal characteristics (510), and previous deal performance data (515) are described. Previous deals (505) contain previous deal characteristics (510), and are associated with previous deal performance data (515). Previous deals (505), previous deal characteristics (510), and previous deal performance data (515) may be stored and managed by a deal recommendation application in a data repository. Previous deal characteristics (510) are elements of previous deals (505) that detail the economic, financial, operational, strategic, and/or legal aspects of the previous deals (505). Previous deals characteristics (510) may include numerous characteristics, determined by a business, in conjunction with a deal recommendation application, such as a sale item, a sale item value, a discount to customers, a deal price, a launch date, a launch time, a set of deal providers, locations, a minimum number of deals for deal activation, a maximum number of deals sold before the end of a deal, a timeframe, a set of deal provider placement levels, limitations, splits of profits with deal providers, a recurring timeperiod, a frequency of recurring deals, a deal redemption period, and special staffing details.

A sale item identifies a product and/or service of a business that was offered in a deal (e.g. "a skydiving ticket"). A sale item value identifies the retail price of the sale item (e.g. "$150"). A discount to customers identifies the percentage of the sale item value that was discounted in the deal (e.g. "50%"). A deal price identifies the price of the sale item offered to customers including the discount (e.g. "$75"). A launch date identifies the calendar date on which the deal was activated (i.e. made live) by a deal provider (e.g. "Mar. 20, 2011"). A launch time identifies the hour and minute at which the deal was activated by a deal provider (e.g. "12:00 AM PT").

A set of deal providers identifies the deal providers that marketed a deal on their websites (e.g. "Product Specific Deal Provider", "Gigantic Deal Provider", "Local Deal Provider"). Locations identify the geographic positions where a deal was marketed and/or where deals were accepted at business locations (e.g. "San Francisco, Calif.", "Los Angeles, Calif.", "New York, N.Y.", "Miami, Fla.").

A minimum number of deals for deal activation identifies a number of deals that were required to be sold before a deal was activated by a deal provider as a "live" deal (e.g. "100"). For example, if less than 100 deals were sold, then the deal may not have been considered "live", and those customers that purchased deals would not have been charged. In this example, if more than 100 customers purchased a deal, the deal was considered "live", and all customers who purchased the first 100 deals and all subsequent customers were charged for the purchase of the deal. A maximum number of deals sold before the end of a deal identifies a number of deals that were required to be sold for the deal to be deactivated by the deal provider (e.g. "2000"). For example, if the maximum number of deals sold was 2000, then no more than 2000 deals were to be sold, and when a customer purchased the 2000$^{th}$ deal, the deal was deactivated and no more customers were allowed to purchase the deal.

A timeframe identifies the number of hours that a deal was live (e.g. "24 hours"). For example, if the timeframe for a deal is 24 hours, then the deal was only active for 24 hours from the launch time of the deal. A deal provider placement level ranks a deal according to where it was marketed on a website of a deal provider (e.g. "high"). For example, a "high" deal provider placement level allowed a deal provider to place a deal in the center of their website, in a "prime" deal location. A "medium" deal provider placement level allowed a deal provider to place a deal on the side of their website, in a less desirable deal location. A "low" deal provider placement level allowed a deal provider to place a deal on the bottom of their website or on a page that is not the main webpage. A deal provider placement level may also be described by a numeric rank (e.g. 0 to 100 on a scale of 100), where 100 is the highest possible rank, and 0 is the lowest possible rank. Those skilled in the art will appreciate that there may be various other ranking schemes for deal provider placement levels that have not been described.

Limitations identify legal restrictions that were placed on a deal (e.g. "only 1 deal per customer"). A split of profits with a deal provider identifies a percentage of revenue that were derived from sales of a deal that a business shared with a deal provider (e.g. "50%"). A recurring timeperiod identifies a number of months over which a deal was activated, not necessarily continuously (e.g. "3 months"). A frequency of recurring deals identifies a rate of occurrence with which a deal was activated for purchase by consumers over a recurring timeperiod (e.g. "1 per month"). For example, a deal may be activated over 3 months, once per month, for 24 hours. A deal redemption period identifies a calendar span over which a deal was redeemed by consumers, either virtually over the Internet, or in person at a store (e.g. "Jun. 20, 2011-Jul. 20, 2011"). Special staffing details identify operational requirements that were specific to the sale of a deal ("increase staff by 25% during the deal redemption period"). This may be, for instance, to handle redemptions of deals at store locations.

Previous deal performance data (515) may include various elements detailing the performance of a deal after it has been marketed by a deal provider, such as a total deal revenue, a total number of deals sold, a total number of customers, an average customer spend per deal, an average extra spend per deal, a most contributing product to extra spend, dates of most purchases, times of most purchases, a deal provider with the most sales, a number of customers per location, a revenue per location, a time until deal activation, a time until deal closure, a deal sales distribution in the timeframe, a placement efficiency, a profit split rank, a recurring timeperiod rank, a frequency rank, a deal redemption period rank, and a staffing details rank.

A "total deal revenue" identifies a capital amount that sales of a deal generated (e.g. "$75,000"). A "total number of deals sold" identifies the number of deals purchased by customers (e.g. "1000"). A "total number of customers" identifies the number of customers that purchased a deal (e.g. "1000"). An "average customer spend per deal" identifies the average amount of capital spent by a customer on a deal, including the deal and extra purchases (e.g. "$125"). An "average extra spend per deal" identifies the average amount of capital spent by a customer beyond the deal price when redeeming a deal (e.g. "$50").

A "most contributing product to extra spend" identifies a product that contributed to the most extra spend by the average customer (e.g. "a skydiving video"). "Dates of most purchases" identify calendar dates with the most volume of deal purchases by customers (e.g. "Mar. 20, 2011", "Apr. 20, 2011"). "Times of most purchases" identify the hours and minutes when the most volume of deals were purchased by customers (e.g. "2:00 PM PT", "7:32 PM PT"). A "deal provider with the most sales" identifies a deal provider that sold the most deals to customers (e.g. "Gigantic Deal Provider").

A "number of customers per location" identifies the total number of customers that redeemed deals according to geographic location (e.g. "San Francisco, Calif.: 350", "Los Angeles, Calif.: 250", "New York, N.Y.: 200", "Miami, Fla.: 200"). Customers may also be identified according to their personal addresses used when purchasing a deal. A "revenue per location" identifies a total revenue amount generated by redemption of deals according to geographic location (e.g. "San Francisco, Calif.: $26,250", "Los Angeles, Calif.: $18, 750", "New York, N.Y.: $15,000", "Miami, Fla.: $15,000"). A "time until deal activation" identifies the number of hours that it took for a deal to be activated (e.g. "10 hours").

A "time until deal closure" identifies a number of hours that it took for a deal to be deactivated (e.g. "24 hours"). A "deal sales distribution in the timeframe" identifies a breakdown of deals sold by percentages during times of the day (e.g. "12:00 AM-06:00 AM: 5%", "06:00 AM-12:00 PM: 25%", "12:00 PM-06:00 PM: 30%", "06:00 PM-12:00 AM: 40%"). The deal sales distribution may indicate the best time of day or the best hours for a particular deal to be marketed.

A "placement efficiency" identifies how well a deal performed according to placement in a deal provider's website as compared to previous deals marketed by that deal provider that were similar in nature (e.g. industry, price point, product, and/or service). For example, a deal for cupcakes may receive a placement efficiency rating of 85% by a deal provider, as compared to other similar deals for other cupcake businesses that were marketed by the deal provider. In other words, a current deal performed better than 85% of other similar previous deals that had a similar or same placement as the current deal. Those skilled in the art will appreciate that there may be various other schemes for ranking placement efficiency that have not been described.

A "profit split rank" identifies how well a deal performed according to profit split with a deal provider compared to previous deals marketed by that deal provider that were similar in nature and had the same profit split. For example, a deal for cupcakes may receive a profit split rank of 95% by a deal provider, as compared to other similar deals for other cupcake businesses that were marketed by the deal provider. In other words, the current deal performed better than 95% of other similar previous deals that had the same profit split with the deal provider as the current deal. Those skilled in the art will appreciate that there may be various other schemes for ranking profit split that have not been described.

A "recurring timeperiod rank" identifies how well a deal performed according to a recurring timeperiod of the deal marketed by a deal provider compared to previous deals marketed by that deal provider that were similar in nature and had the same recurring timeperiod. For example, a deal for cupcakes may receive a recurring timeperiod rank of 90% by a deal provider, as compared to other similar deals for other cupcake businesses that were marketed by the deal provider. In other words, the current deal performed better than 90% of other similar previous deals that had the same recurring timeperiod as the current deal. Those skilled in the art will appreciate that there may be various other schemes for ranking recurring timeperiod that have not been described.

A "frequency rank" identifies how well a deal performed according to a frequency of the deal marketed by a deal provider compared to previous deals marketed by that deal provider that were similar in nature and had the same frequency. For example, a deal for cupcakes may receive a frequency rank of 50% by a deal provider, as compared to other similar deals for other cupcake businesses that were marketed by the deal provider. In other words, the current deal performed better than 50% of other similar previous deals that had the same frequency as the current deal. Those skilled in the art will appreciate that there may be various other schemes for ranking frequency that have not been described.

A "deal redemption period rank" identifies how well a deal performed according to a deal redemption period of the deal marketed by a deal provider compared to previous deals marketed by that deal provider that were similar in nature and had the same deal redemption period. For example, a deal for cupcakes may receive a deal redemption period rank of 65% by a deal provider, as compared to other similar deals for other cupcake businesses that were marketed by the deal provider. In other words, the current deal performed better than 65% of other similar previous deals that had the same deal redemption period as the current deal. Those skilled in the art will appreciate that there may be various other schemes for ranking a deal redemption period that have not been described.

A "staffing details rank" identifies how well a deal performed according to staffing details of the deal marketed by a deal provider compared to previous deals marketed by that deal provider that were similar in nature and had the same staffing details. For example, a deal for cupcakes may receive a staffing details rank of 80% by a deal provider, as compared to other similar deals for other cupcake businesses that were marketed by the deal provider. In other words, the current deal performed better than 80% of other similar previous deals that had the same staffing details as the current deal. Those skilled in the art will appreciate that there may be various other schemes for ranking staffing details, and various other metrics by which deals may be ranked by deal providers that have not been described.

In FIG. 5B, performance thresholds (520), high performance deal characteristics (525), and deal characteristics (530) are discussed. Performance thresholds (520) are numeric quantities, capital amounts, calendar dates, hours, ranges, and percentages that define points past which a performance data item associated with a previous deal is satisfactory. Performance thresholds (520) may include thresholds such as a total deal revenue threshold, a total number of deals sold threshold, a total number of customers threshold, an average customer spend per deal threshold, an average extra spend per deal threshold, an extra spend contributing product type, dates of most purchases, times of most purchases, a deal provider, a number of customers per location threshold, a revenue per location threshold, a time until deal activation threshold, a time until deal closure threshold, a deal sales distribution in the timeframe threshold, a placement efficiency threshold, a profit split rank threshold, a recurring timeperiod rank threshold, a frequency rank threshold, a deal redemption period rank threshold, and a staffing details rank threshold.

A "total deal revenue threshold" identifies a minimum capital amount that sales of a previous deal must have generated (e.g. ">$50,000"). A "total number of deals sold threshold" identifies a minimum number of deals required to have been purchased by customers (e.g. ">300"). A "total number of customers threshold" identifies a minimum number of customers required to have purchased a previous deal (e.g. ">600"). An "average customer spend per deal threshold" identifies a minimum average amount of capital required to have been spent by a customer on a previous deal, including extra purchases (e.g. ">$100"). An "average extra spend per deal threshold" identifies a minimum average amount of capital required to have been spent by a customer beyond the deal price when redeeming a previous deal (e.g. ">$35").

An "extra spend contributing product type" identifies a product type that contributed to the most extra spend by the average customer (e.g. "an accessory"). "Dates of most purchases" identify calendar dates as a selection mechanism for when the most volume of deals were purchased by customers (e.g. "Mar. 1, 2011-May 1, 2011"). "Times of most purchases" identify the hours and minutes as a selection mechanism for when the most volume of deals were purchased by customers (e.g. "12:00 PM-12:00 AM PT"). A "deal provider threshold" uses a deal provider name as a selection mechanism to find the previous deals for which the deal provider sold the most deals to customers (e.g. "Gigantic Deal Provider").

A "number of customers per location threshold" identifies the total number of customers required to have redeemed deals per geographic location (e.g. ">300"). A "revenue per location threshold" identifies a total required revenue amount to have been generated by redemption of deals per geographic location (e.g. ">$20,000"). A "time until deal activation threshold" identifies a maximum number of hours that it took for a deal to be activated (e.g. "<5 hours").

A "time until deal closure threshold" identifies a maximum number of hours that it took for a deal to be deactivated (e.g. "<13 hours"). "Deal sales distribution in the timeframe thresholds" identify a minimum required breakdown of deals sold by percentages during times of the day (e.g. "12:00 AM-06:00 AM: 50%", "06:00 AM-12:00 PM: 50%", "12:00 PM-06:00 PM: 0%", "06:00 PM-12:00 AM: 0%").

A "placement efficiency threshold" identifies a required deal performance according to placement efficiency in a deal provider's website. For example, a search for previous deals with a placement efficiency rating of 80% or greater may be conducted using the placement efficiency threshold. A "profit split rank threshold" identifies a required deal performance according to profit split rank with a deal provider. For example, a search for previous deals with a profit split rank of 90% or greater may be conducted using the profit split rank threshold.

A "recurring timeperiod rank threshold" identifies a required deal performance according to recurring timeperiod rank by a deal provider. For example, a search for previous deals with a recurring timeperiod rank of 50% or greater may be conducted using the recurring timeperiod rank threshold. A "frequency rank threshold" identifies a required deal performance according to frequency rank by a deal provider. For example, a search for previous deals with a frequency rank of 35% or greater may be conducted using the frequency rank threshold.

A "deal redemption period rank threshold" identifies a required deal performance according to deal redemption period rank by a deal provider. For example, a search for previous deals with a deal redemption period rank of 45% or greater may be conducted using the deal redemption period rank threshold. A "staffing details rank threshold" identifies a required deal performance according to staffing details rank with a deal provider. For example, a search for previous deals with a staffing details rank of 30% or greater may be conducted using the staffing details rank threshold.

High performance deal characteristics (525) are selected previous deal characteristics that have satisfied or exceeded the performance thresholds (520). High performance deal characteristics (525) may include characteristics such as a sale item (e.g. "a skydiving ticket"), a sale item value (e.g. "$150"), a discount to customers (e.g. "50%"), a deal price (e.g. "$75"), a launch date (e.g. "Mar. 20, 2011"), a launch time (e.g. "12:00 PM PT"), a deal provider or deal providers (e.g. "Gigantic Deal Provider"), locations (e.g. "San Francisco, Calif."), a minimum number of deals for deal activation (e.g. "100"), a maximum number of deals sold before the end of a deal (e.g. "2000"), a timeframe (e.g. "12 hours"), a deal provider placement level or a set of deal provider placement levels (e.g. "high"), limitations (e.g. "only 1 deal per customer"), split of profits with deal provider(s) (e.g. "50%"), a recurring timeperiod (e.g. "3 months"), a frequency of recurring deals (e.g. "1 per month"), a deal redemption period (e.g. "Jun. 20, 2011-Jul. 20, 2011"), and special staffing details (e.g. "increase staff by 5% during deal redemption period to handle increased volume of customers"). Please refer to the description of FIG. 5A for details of each of these characteristics.

Deal characteristics (530) are characteristics selected by a business and/or a deal recommendation application from the high performance deal characteristics (525). Deal characteristics (530) are selected to make an optimum configuration of characteristics for a given deal goal. Deal characteristics (530) may include characteristics such as a sale item (e.g. "a skydiving ticket"), a sale item value (e.g. "$200"), a discount to customers (e.g. "45%"), a deal price (e.g. "$110"), a launch date (e.g. "Jun. 15, 2011"), a launch time (e.g. "12:00 PM PT"), a deal provider or deal providers (e.g. "Gigantic Deal Provider"), locations (e.g. "San Francisco, Calif.", "Malibu, Calif.", "Waikiki, Hi.", "Tokyo, Japan"), a minimum number of deals for deal activation (e.g. "100"), a maximum number of deals sold before the end of a deal (e.g. "4000"), a timeframe (e.g. "12 hours"), a deal provider placement level or a set of deal provider placement levels (e.g. "high"), limitations (e.g. "only 1 deal per customer"), split of profits with deal provider(s) (e.g. "40%"), a recurring timeperiod (e.g. "n/a"), a frequency of recurring deals (e.g. "n/a"), a deal redemption period (e.g. "Jun. 15, 2011-Jul. 15, 2012"), and special staffing details (e.g. "increase staff by 5% during deal redemption period to handle increased volume of customers"). Those skilled in the art will appreciate that deal characteristics (530) may be a combination of characteristics from various previous deals that have selected as high performance deal characteristics (525) using performance thresholds (520). Please refer to the description of FIG. 5A for details of each of these characteristics.

Figure 6A:
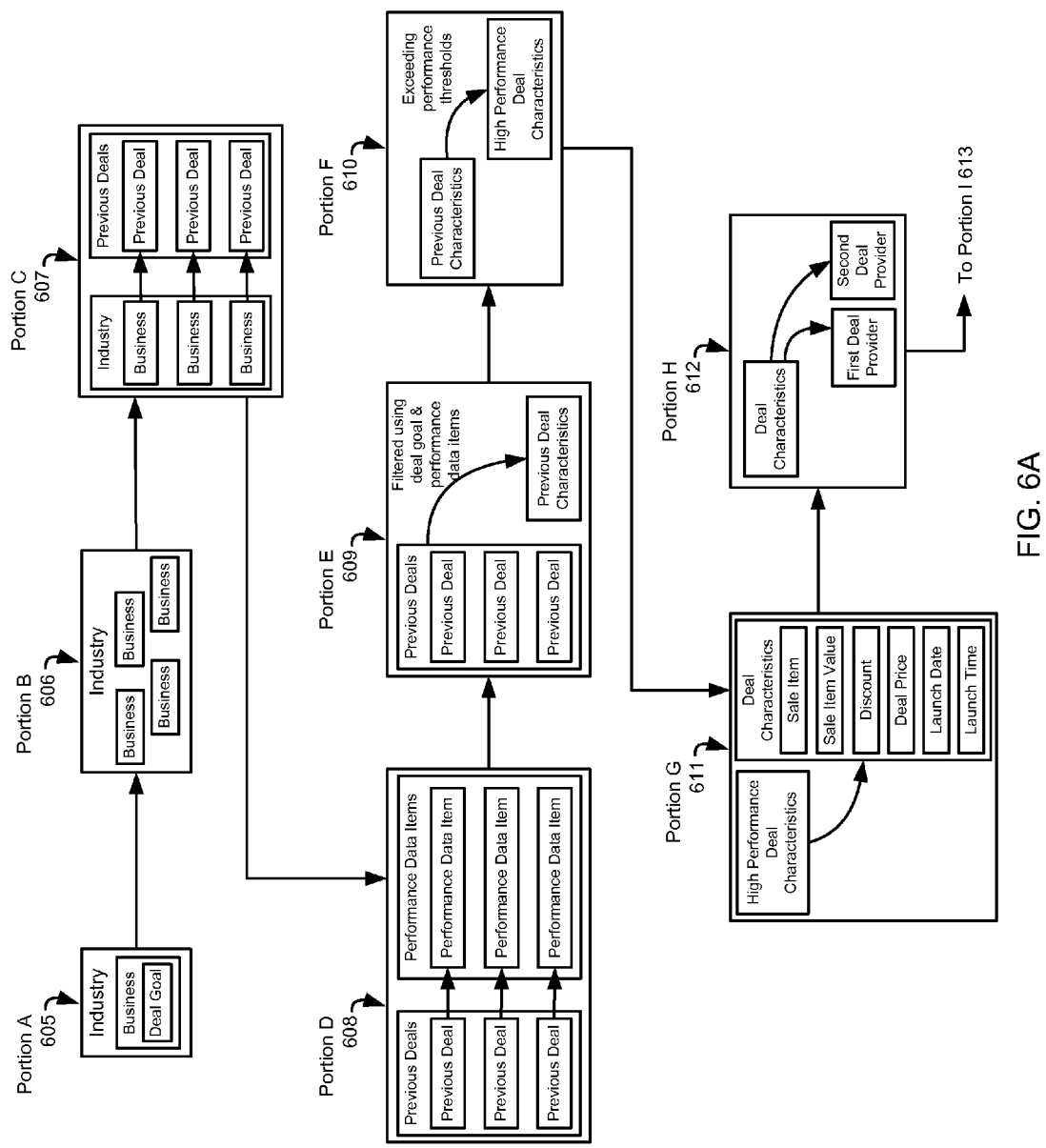
Figure 6B:
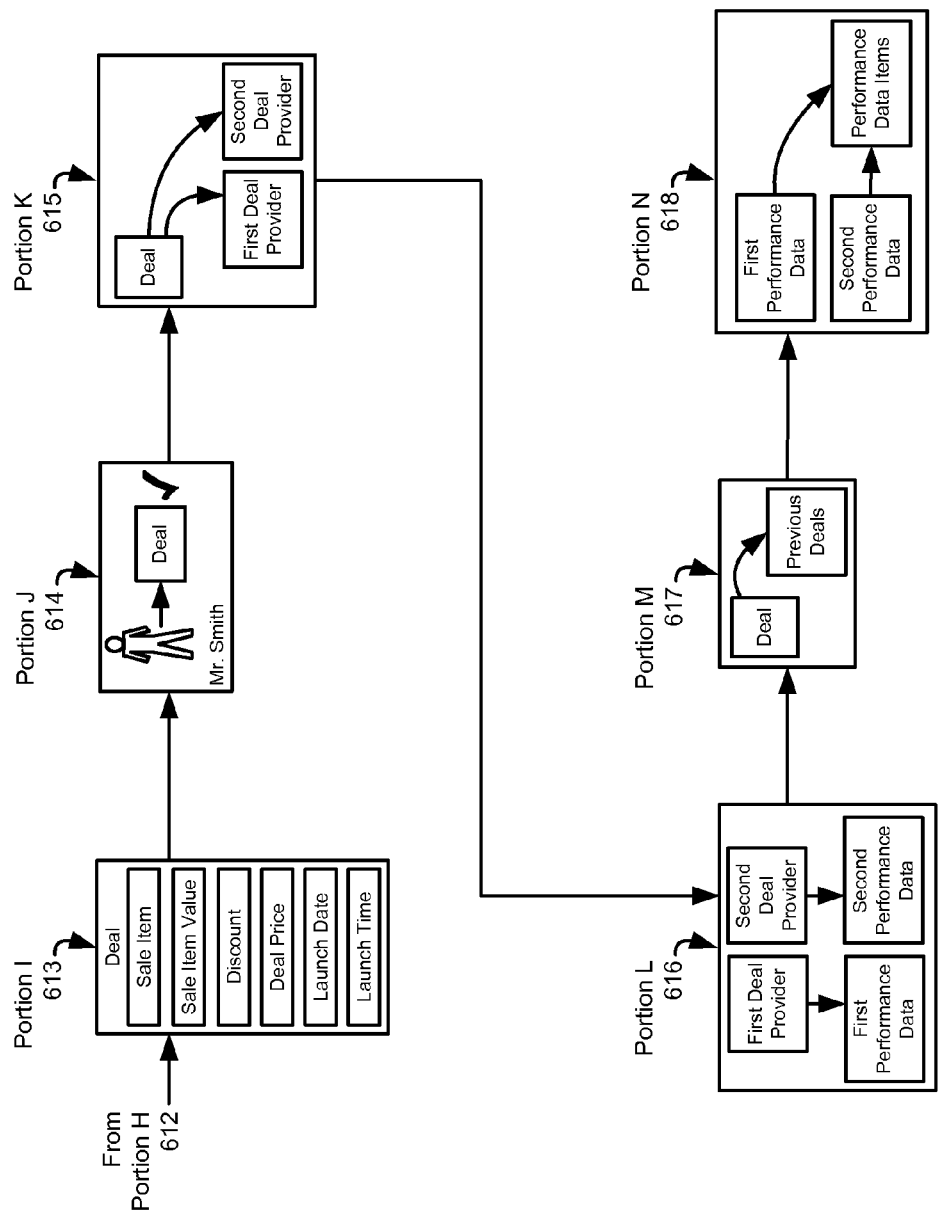

FIGS. 6A and 6B show examples in accordance with one or more embodiments of the invention. The examples shown in FIGS. 6A and 6B may be used, for instance, with the system (100) of FIG. 1, to generate a deal. The examples shown in FIGS. 6A and 6B may differ among embodiments of the invention, and one or more of the elements may be optional.

In portion A (605), the deal recommendation application (DRA) identifies a deal goal of a business in an industry. The industry may be, for instance, mobile device applications, the business may be a mobile device application designer called "Mobile Design", and the deal goal may be to maximize revenues of the deal.

In portion B (606), the DRA identifies businesses in the industry. These other businesses may be mobile device application designers competing with Mobile Design.

In portion C (607), the DRA obtains previous deals issued by the businesses. These previous deals, for instance, may have been generated for mobile device application products.

In portion D (608), the DRA identifies performance data items relating to the previous deals. The performance data items may rank, for instance, how well the previous deals performed according to revenues, number of customers, average customer spend per deal, locations, and so forth.

In portion E (609), the DRA filters, using the deal goal and the performance data items, the previous deals to identify previous deal characteristics. The previous deal characteristics are those characteristics that may be used to achieve the deal goal for the present deal, based on how the previous deal characteristics performed (i.e. as judged by the performance data items).

In portion F (610), the DRA selects high performance deal characteristics from the previous deal characteristics that exceed performance thresholds. The performance thresholds may require, for instance, that the previous deal characteristics exceed a certain amount of revenue generated, number of customers that purchased a deal, performance per location, and so forth.

In portion G (611), the DRA generates deal characteristics based on the high performance deal characteristics. These deal characteristics include a sale item, a sale item value, a discount, a deal price, a launch date, and a launch time. The deal characteristics may be selected from numerous previous deals and previous deal characteristics, as filtered into high performance deal characteristics by performance thresholds.

In portion H (612), the DRA identifies a first deal provider and a second deal provider based on the deal characteristics. The deal providers may be chosen because they have a history of executing deals well for certain products, geographies, customer demographics, and so forth.

In portion I (613), the DRA generates a deal for the business. The deal includes the deal characteristics. The deal may be used by the business as a marketing mechanism to sell a mobile device application.

In portion J (614), the DRA receive an approval of the deal from a user (i.e. associated with a business). For example, Mr. Smith (i.e. the owner of the mobile device application design business "Mobile Design") may approve the deal.

In portion K (615), the DRA transmits the deal to the first deal provider and the second deal provider. The deal providers may act as marketing and distribution channels for the deal.

In portion L (616), the DRA receives performance data about the deal from the first deal provider and the second deal provider. The performance data identifies how well the deal performed with the deal providers.

In portion M (617), the DRA adds the deal to the previous deals. In this way, the deal may be used to generate other deals in the future. Specifically, the deal for Mobile Design may be used to generate other deals in the same industry in the future.

In portion N (618), the DRA adds the performance data to the performance data items. In this way, the performance data may be used to generate future deals. Specifically, the performance data associated with the deal for Mobile Design may be used to generate future deals in the same industry.

Figure 7:
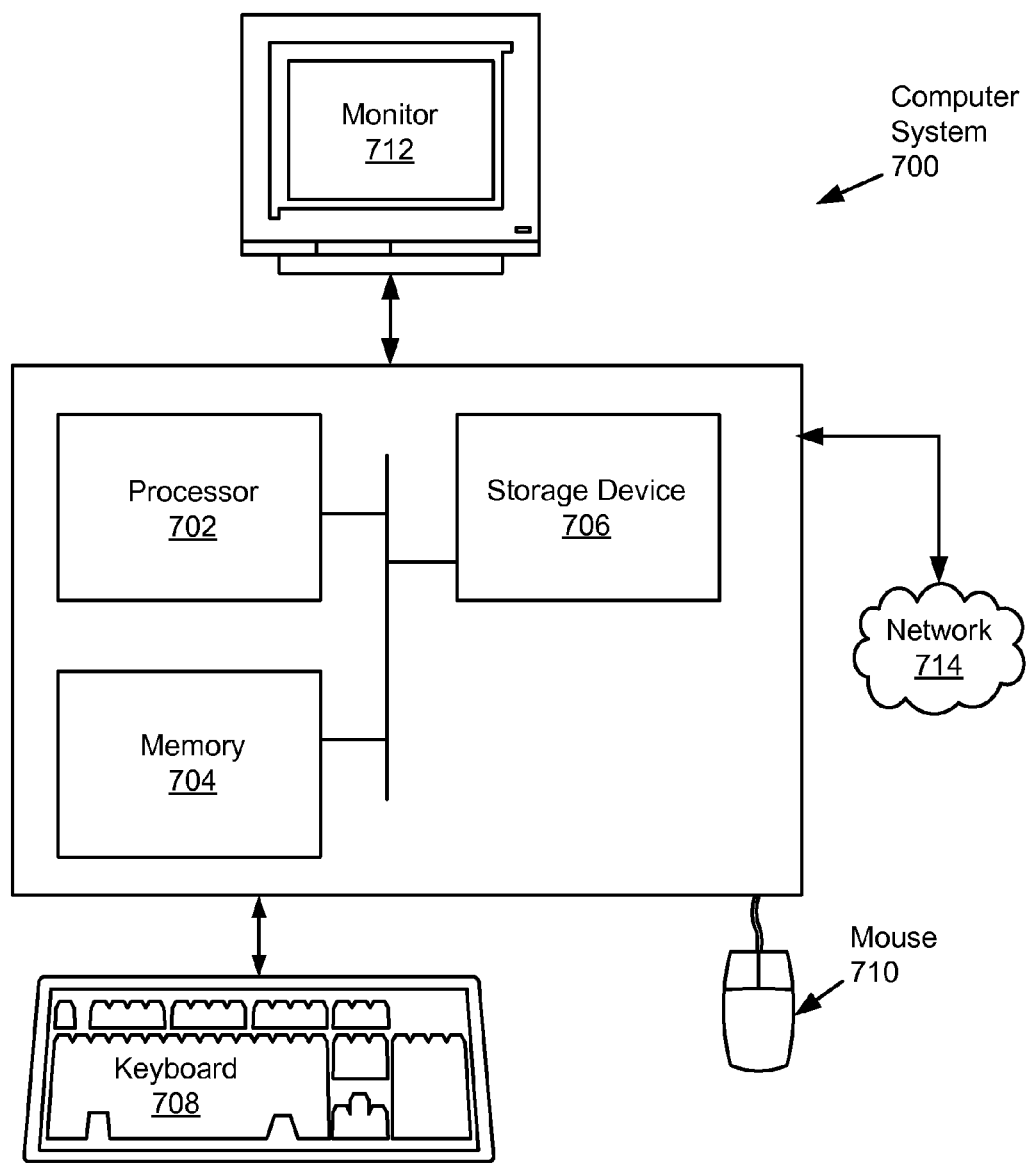
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702), such as a central processing unit (CPU), integrated circuit, or hardware processor, associated memory (704) (e.g. random access memory (RAM), cache memory, flash memory, etc.), a storage device (706) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (702) is hardware. For example, the processor may be an integrated circuit. The computer system (700) may also include input means, such as a keyboard (708), a mouse (710), or a microphone (not shown). Further, the computer system (700) may include output means, such as a monitor (712) (e.g. a liquid crystal display (LCD), a plasma display, or cathode ray tube (CRT) monitor). The computer system (700) may be connected to a network (714) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (700) includes at least the minimal processing, input, and/or output means necessary to practice embodiments of the invention.

Further, in one or more embodiments of the invention, one or more elements of the aforementioned computer system (700) may be located at a remote location and connected to the other elements over a network. Further, embodiments of the invention may be implemented on a distributed system having a plurality of nodes, where each portion of the invention (e.g. deal recommendation application, deal goal engine, business identification engine, previous deals engine, performance data engine, previous deal characteristics engine, high performance deal characteristics engine, deal characteristics engine, deal provider engine, deal generation engine, approval engine, deal transmission engine, and improvement engine) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a deal for a business in a particular industry, comprising:
   identifying, using a processor, a deal goal of the business, wherein the deal goal identifies an outcome desired by the business for the deal;
   obtaining a plurality of previous deals issued by a plurality of businesses in the particular industry;
   identifying a plurality of performance data items relating to the plurality of previous deals;
   filtering, using the processor, the deal goal, and the plurality of performance data items, the plurality of previous deals to identify a plurality of previous deal characteristics;
   selecting a plurality of high performance deal characteristics from the plurality of previous deal characteristics, wherein the plurality of high performance deal characteristics exceeds a plurality of performance thresholds;
   generating, using the processor and the plurality of high performance deal characteristics, a plurality of deal characteristics for the deal,
   wherein the plurality of deal characteristics is a combination of deal characteristics based on the plurality of performance thresholds, and
   wherein the combination of deal characteristics comprises a profit split that is a percentage of a deal revenue shared with a first deal provider, a recurring time period that is a number of months during which the deal is active on a periodic basis, a frequency of recurring deals that is a number of activations of the deal during the recurring time period, a deal redemption period that is specified by a starting date and an ending date, and a plurality of special staffing details indicating an increase in staffing for the deal;
   identifying, based on the plurality of deal characteristics, the first deal provider and a second deal provider from a plurality of deal providers;
   generating, using the processor and for the business, the deal comprising the plurality of deal characteristics;
   receiving, from a member of the business, an approval of the deal; and
   transmitting the deal to the first deal provider and the second deal provider.

2. The method of claim 1, further comprising:
   receiving, from the first deal provider, a first performance data item identifying a first performance of the deal with the first deal provider;

receiving, from the second deal provider, a second performance data item identifying a second performance of the deal with the second deal provider;

adding the first performance data item and the second performance data item to the plurality of performance data items; and adding the deal to the plurality of previous deals.

3. The method of claim 1, further comprising:

identifying a customer age range based on a customer segment;

identifying a gender based on the customer segment;

identifying a plurality of customer interests based on the customer segment;

identifying a plurality of previous deals bought based on the customer segment; and identifying a geographic location based on the customer segment.

* * * * *